US010054310B2

(12) United States Patent
Lirette et al.

(10) Patent No.: US 10,054,310 B2
(45) Date of Patent: Aug. 21, 2018

(54) FAST-HEATING OUTDOOR GAS BURNER APPARATUS AND METHOD

(71) Applicants: Caliste A. Lirette, Harvey, LA (US); Win Tran, Harvey, LA (US)

(72) Inventors: Caliste A. Lirette, Harvey, LA (US); Win Tran, Harvey, LA (US)

(73) Assignee: Burning Point, L.C., Harvey, LA (US)

( * ) Notice: Subject to any disclaimer, the term of this patent is extended or adjusted under 35 U.S.C. 154(b) by 296 days.

(21) Appl. No.: 15/002,191

(22) Filed: Jan. 20, 2016

(65) Prior Publication Data

US 2017/0205066 A1 Jul. 20, 2017

(51) Int. Cl.
*F23C 5/00* (2006.01)
*F23D 14/04* (2006.01)
*F24C 3/02* (2006.01)
*F24C 3/08* (2006.01)

(52) U.S. Cl.
CPC .............. *F23D 14/045* (2013.01); *F24C 3/02* (2013.01); *F24C 3/08* (2013.01)

(58) Field of Classification Search
CPC ..................................................... F23D 14/045

USPC ................................ 431/8; 126/25 R, 30, 38
See application file for complete search history.

(56) References Cited

U.S. PATENT DOCUMENTS

| | | | |
|---|---|---|---|
| 2,452,925 A | 11/1948 | Greer, Jr. | |
| 3,153,410 A | 10/1964 | Goodare et al. | |
| 5,787,875 A | 8/1998 | Munos et al. | |
| 6,439,107 B1 * | 8/2002 | Bourgeois ............... | A47J 27/04 126/30 |
| 8,938,870 B1 * | 1/2015 | Bourgeois ........... | A47J 37/0713 126/25 R |
| 2002/0040644 A1 | 4/2002 | McLemore et al. | |
| 2005/0208444 A1 | 9/2005 | Butler et al. | |
| 2008/0302353 A1 | 12/2008 | Sun | |
| 2009/0308373 A1 | 12/2009 | Scott et al. | |
| 2010/0258105 A1 | 10/2010 | Simms, II | |
| 2010/0311001 A1 | 12/2010 | Helmsen et al. | |
| 2014/0230701 A1 | 8/2014 | Cheng et al. | |

* cited by examiner

*Primary Examiner* — Avinash Savani
(74) *Attorney, Agent, or Firm* — Keaty Law Firm, LLC

(57) ABSTRACT

A fast-heating outdoor gas burner apparatus and method for more thorough combustion and more efficient heating of a cooking pot, with increased air flow for increased oxygen for combustion, and a slowed heated-air flow close to the cooking pot.

18 Claims, 9 Drawing Sheets

FAST-HEATING OUTDOOR GAS BURNER APPARATUS AND METHOD

BACKGROUND OF THE INVENTION

The present invention provides a fast-heating outdoor gas burner apparatus and method for more thorough combustion and more efficient heating of a cooking pot.

Large scale outdoor cooking, such as cooking for festivals and fairs and other large gatherings, is often done on gas-fueled burners designed to accommodate large cooking pots. In Louisiana, such outdoor cooking might be boiling crawfish or crabs or making jambalaya. Propane from a standard 4.5-gallon tank is often used as the fuel, especially when portability is needed. Natural gas, which has somewhat less energy per unit of volume than propane, is also used, especially when a piped-in source of natural gas is available.

The presently known and available outdoor gas burners are not highly efficient in bringing the gas to a complete combustion, and therefore do not produce as hot a flame as the gas is inherently capable of producing. Also, presently known and available outdoor gas burners are not highly efficient in focusing the heat on the cooking pot, and therefore waste a portion of the heat generated.

U.S. Pat. No. 3,153,410, issued Oct. 20, 1964 to R. P. Goodare et al. for "Torch and Pot Holder," discloses holders for torches and melting pots, such as those used by plumbers to melt lead. The Goodare disclosure covers a torch and pot holder comprising a substantially horizontal base plate having an upright cylindrical opening through it, a plurality of raised ribs on the top surface of the base plate extending from the base plate cylindrical opening in a radial outward direction, a downwardly extending cylindrical chimney secured at its upper end to the base plate around the cylindrical opening through the base plate, the diameter of said upper end of said chimney being equal to the diameter of the cylindrical opening through said base plate, the chimney having a plurality of lateral openings around its lower portion, said chimney being formed with a bottom plate and having an upright opening in its bottom plate, a plurality of elongated upright ground engaging legs secured at their upper ends to the base plate and each being of sufficient length to extend a substantial distance below the lower end of the chimney and hold the opening in the bottom plate of the chimney clear of any obstruction, and a torch insertable into one of said lateral openings of said chimney to be removably supported by said chimney.

U.S. Publication No. 2002/0040644, published Apr. 11, 2002 by Don McLemoreet et al. on a "Cooking Apparatus," discloses a cooking apparatus for improved heat circulation and containment when smoking or grilling using electric, gas, or charcoal as the heat source. The base pan design enhances heat containment, and offers a channel design in the bottom of the base pan. A flame disk for even heat distribution is provided and can be used in conjunction with the base pan, and prevents internal food drippings from escaping through the disk. The disk design enhances the heat efficiency, and safeguards against drippings or ashes falling through to the burner or ground. The holes in the disk are raised, and have attached covers strategically placed over the holes to deter drippings or ashes from falling through. A fire pit container is also provided and is designed for use with the base pan. The fire pit container supports a heat source, such as a gas burner, which directs a flame toward the base pan open hole and also toward the underside of a flame disk when a flame disk is suspended above the base pan hole.

U.S. Publication No. 2010/0258105, published Oct. 14, 2010 by Lee Simms II John on an "Egg-Shaped Outdoor Cooker," discloses a non-ceramic, light-weight egg-shaped outdoor cooker made from formed sheet metal. The cooker includes a double-walled kettle, with an inner wall spaced and insulated from an outer wall by an insulating layer. A domed lid is constructed similarly to the double-walled kettle and is hinted to the top of the kettle. By spacing the inner wall from the outer wall and providing an insulating layer, heat transfer to the outside of the cooker is greatly slowed. By constructing the structure of sheet metal, instead of ceramic, the cooker is light-weight, rugged, and economical to manufacture.

U.S. Pat. No. 5,787,875, issued Aug. 4, 1998 to Jess K. Munos et al. for a "Propane Burner System for Orchards," includes a housing, a venture system, and a propane fuel system. The housing preferably includes a bottom enclosure interconnected with a stack and may be a converted standard fuel burning orchard heater. The venture system is positioned within the bottom enclosure so that it extends into the stack. The bottom enclosure has at least one vent/fuel opening and the stack preferably includes an igniter opening. The venture system includes a support system, a flue that is preferably triangular in cross section, an exhausting chamber, and a deflector plate.

U.S. Pat. No. 6,439,107 issued Aug. 27, 2002 to Norman R. Bourgeois for a "Gas Fired Outdoor Cooking Apparatus." The cooking apparatus enables a user to cook (boiling, steaming, or frying), and includes a burner having a base that is specially shaped to cradle a pot. An upper section above the support surface of the burner for engaging the sidewall of the pot should the pot be tipped inadvertently is also included. The burner can include upper members that are supported above the bottom of the pot and a lower member that engages an underlying supporting surface. Alternatively, the burner frame can have a plurality of circumferentially spaced radially extending legs. Struts are shaped and cradle the bottom of the pot and its sidewall.

U.S. Publication No. 2010/0311001 published Dec. 9, 2010 by Frank Helmsen et al. for a "Flame Arrester Arrangement." The publication discloses a flame arrester arrangement having a housing for holding at least two flame arrester inserts having a large number of axial passage gaps dimensioned for a combustible gas, and having an intermediate layer arranged between two flame arrester inserts, which permits a radial distribution of the gas flow emerging from one flame arrester insert and entering an adjacent downstream flame arrester insert, the ability of the flame arrester inserts to be easily assembled and disassembled for servicing purposes without restricting the functional integrity can be achieved by at least one separate closed seal being arranged between a flame arrester insert and the housing or between two flame arrester inserts in such a way that a flow around the flame arrester insert in a space located radially outside the passage gaps is prevented.

U.S. Publication No. 2014/0230701, published Aug. 21, 2014 by Robert K. Cheng et al. on a "Natural Draft Low Swirl Burner," discloses a new design for a low swirl burner in which natural draft rather than a motorized pump is used to move a fuel-air mixture through the burner. This new design enables the burn off of gas at refineries in an environment where electric motors cannot be used because of the potential for sparks, which could trigger explosions. Additional modifications to the burner, including the introduction of flue gas to the burner, allows for the reduction of NOx gas to meet current emission control targets, without the need for further post-combustion emission control systems.

U.S. Pat. No. 2,452,925, issued Nov. 2, 1948 to Carl S. Greer Jr. on an "Elongated Pot Burner and Flame Ring," covers a new and improved vaporizing type burner for liquid fuel and has for an object the provision of an improved construction capable of safe and economical operation over a wide range. The liquid fuel burner comprises an open topped burner pot of elliptical shape cross-sectionally having a bottom wall, a side wall, and a series of upper and lower air inlet openings circumferentially disposed in said side wall to give a substantially uniform supply of air to the pot, fuel supply means for delivering a regulatable quantity of fuel to said pot, and a flame plate at the top of said pot having an elongated flame opening therein, said flame opening being disposed centrally in said flame plate and having its ends on opposite sides of its longitudinal axis a distance closer to the side wall of said pot than other portions of said flame opening.

U.S. Publication No. 2005/0208444 published Sept. 22, 2005 to Gary Butler et al. for a "Method and Apparatus for Modifying the Path of a Flame." The publication discloses an apparatus and method for modifying the appearance of a flame to maximize the size of the flame for a given amount of fuel, increase a burn rate efficiency of the flame, or change the shape of the flame. The shape and size of the flame may be modified by applying a secondary source of fluid to the flame. The secondary source of fluid may cause turbulent fluid flow within the combustion chamber enclosure in which the flame is produced to change the appearance of the flame. The secondary source of fluid may be generated by a flower or fan and may include, for example, a source of fresh combustion air, additional flammable gas such as natural gas, or other fluid additives for enhancement of the flame color, shape, and size.

U.S. Publication No. 2008/0302353 published Dec. 11, 2008 to Yizhong Sun for a "Removable Flame Heat Regulating Apparatus Including an Inner Hollow Shell and an Outer Wall for a Burner of a Gas Stove." The publication discloses a flame heat regulating apparatus for a cooktop of a gas stove, comprising an inner hollow shell and an outer wall which are both placed onto the stove cooktop. The shell further positioned to surround a gas burner is arcuate in shape, having a smaller sized bottom side and a larger sized top side. A plurality of air passages are through the shell, wherein the air passages are more densely distributed onto a lower part of the shell, as compared with the air passages which are less densely distributed onto an upper part of the shell. The outer wall further positioned to surround the shell is comprised of a plurality of air passages which are evenly distributed therethrough. In addition, a plurality of extensions projected upwardly are spaced on a top side of the wall to support a cookware. Application of the flame heat regulating apparatus enables increase of heating efficiency of the flame in cooking, and prevents undesirable heating of a handle of the cookware.

U.S. Publication No. 2009/0308373 published Dec. 17, 2009 to Leon James Scott et al. for a "Portable Insulated Grill," and discloses a portable insulated grill having a housing and a lid, both of which have inner and outer shells of metal with a plenum therebetween filled with an insulating material such as fiberglass. A hinge couples the lid to the housing, and a tube is attached to the bottom of the housing. The grill can be carried on a carrier or on a vehicle. The carrier has a support surface, wheels, and a leg. A bar connected to the support surface extends toward an open side. This bar can removably position in the tube on the bottom of the housing so the support surface can support the grill. As an alternative, the grill's tube can mount on a drawbar attached to a hitch on a vehicle. Inside the grill, the housing has brackets that support a firebox on a first shelf and that support a main grate either on the first shelf or on a second shelf. The main grate has cutaways and can be locked in position by the brackets when positioned on the second shelf. An auxiliary grate has a stand that can connect to the main grate and that allows the auxiliary grate to rotate.

There is a need for an outdoor gas burner that makes more efficient use of the propane or natural gas by more complete and hotter-burning combustion, and by focusing the heat on the cooking pot.

SUMMARY OF THE INVENTION

The present invention is a fast-heating outdoor gas burner apparatus and method for more thorough combustion and more efficient heating of a cooking pot, with increased air flow for increased oxygen for combustion, and a slowed heated-air flow close to the cooking pot.

This invention uses less gas and less time for the same heating capacity of existing outdoor gas burners.

BRIEF DESCRIPTION OF DRAWINGS

Reference will now be made to the drawings, wherein like parts are designated by like numerals, and wherein.

DETAILED DESCRIPTION OF THE INVENTION

Figure 1:
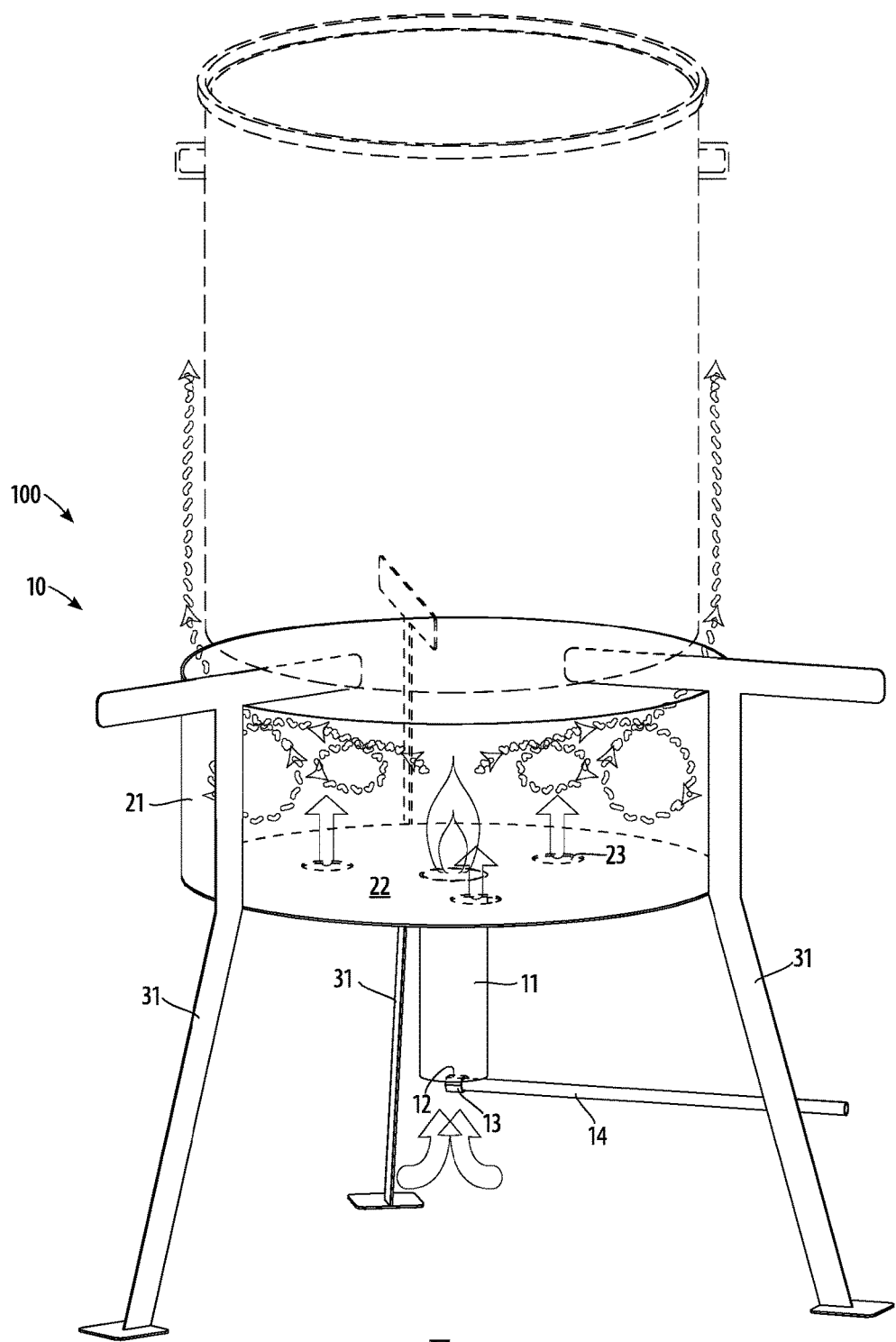
FIG. 1 is a schematic view of the fast-heating outdoor gas burner in use.
Figure 2:
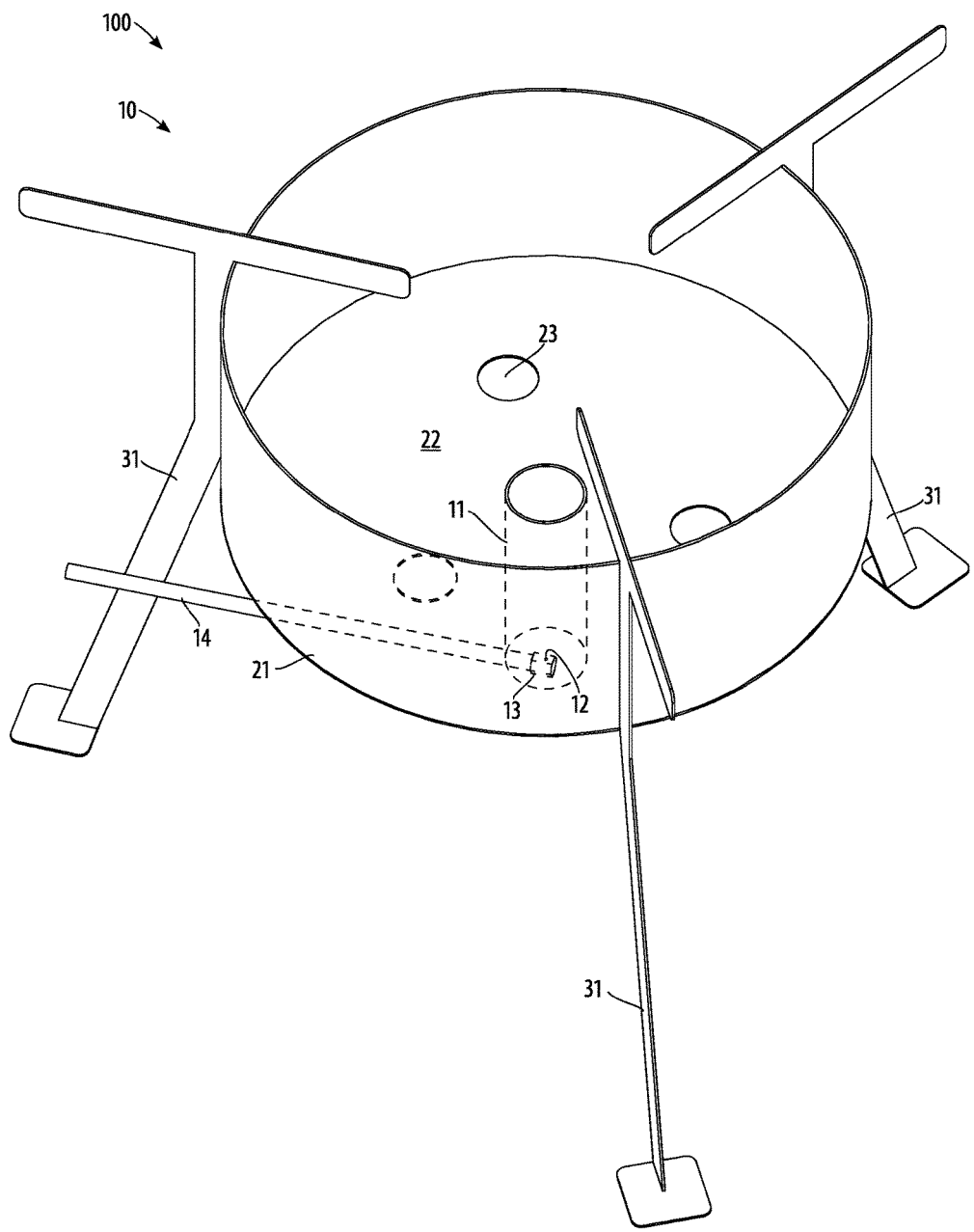
FIG. 2 is an orthographic hidden-line view of an embodiment of the fast-heating outdoor gas burner.
Figure 3:
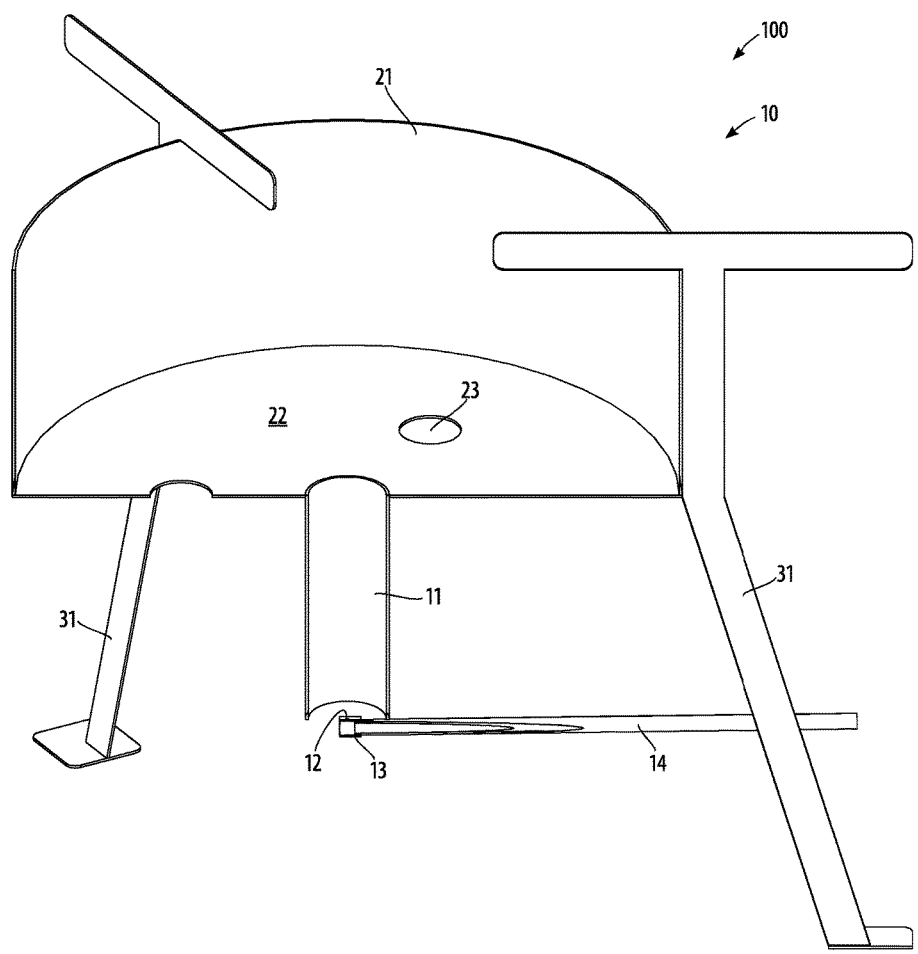
FIG. 3 is a cutaway view of an embodiment of the fast-heating outdoor gas burner.
Figure 4:
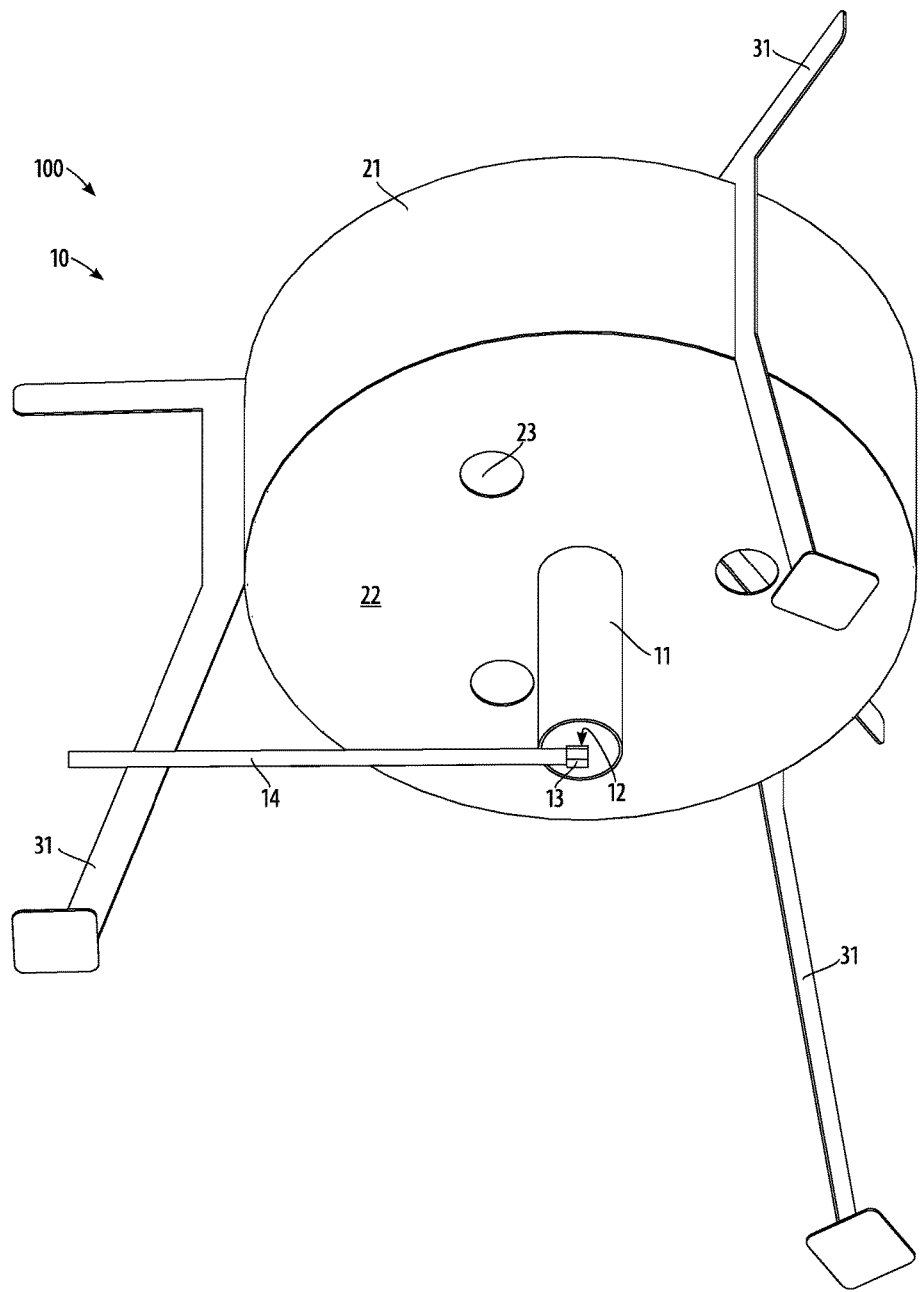
FIG. 4 is an underside orthographic view of an embodiment of the fast-heating outdoor gas burner.
Figure 5:
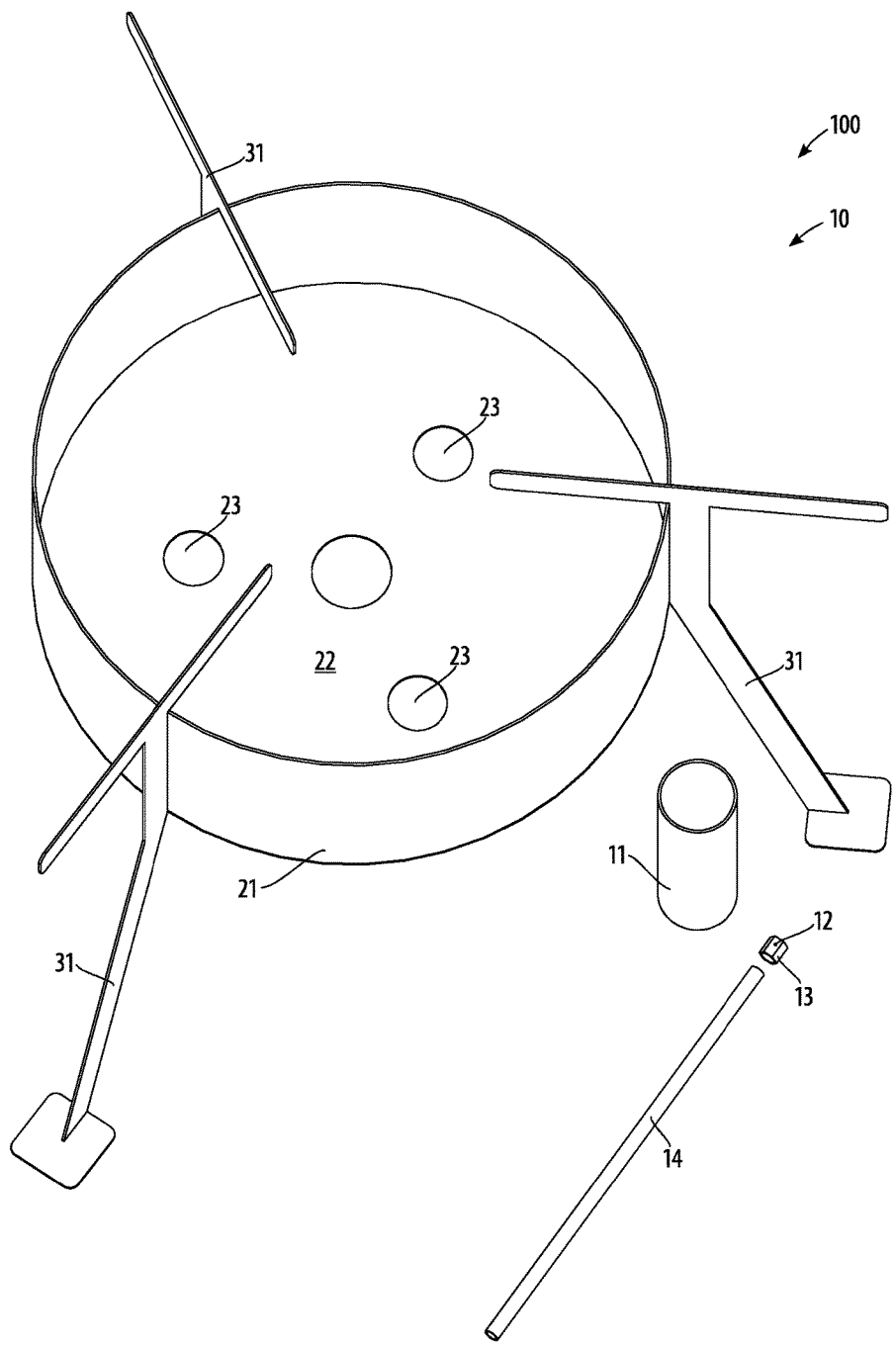
FIG. 5 is a partial-exploded view of an embodiment of the fast-heating outdoor gas burner.
Figure 6:
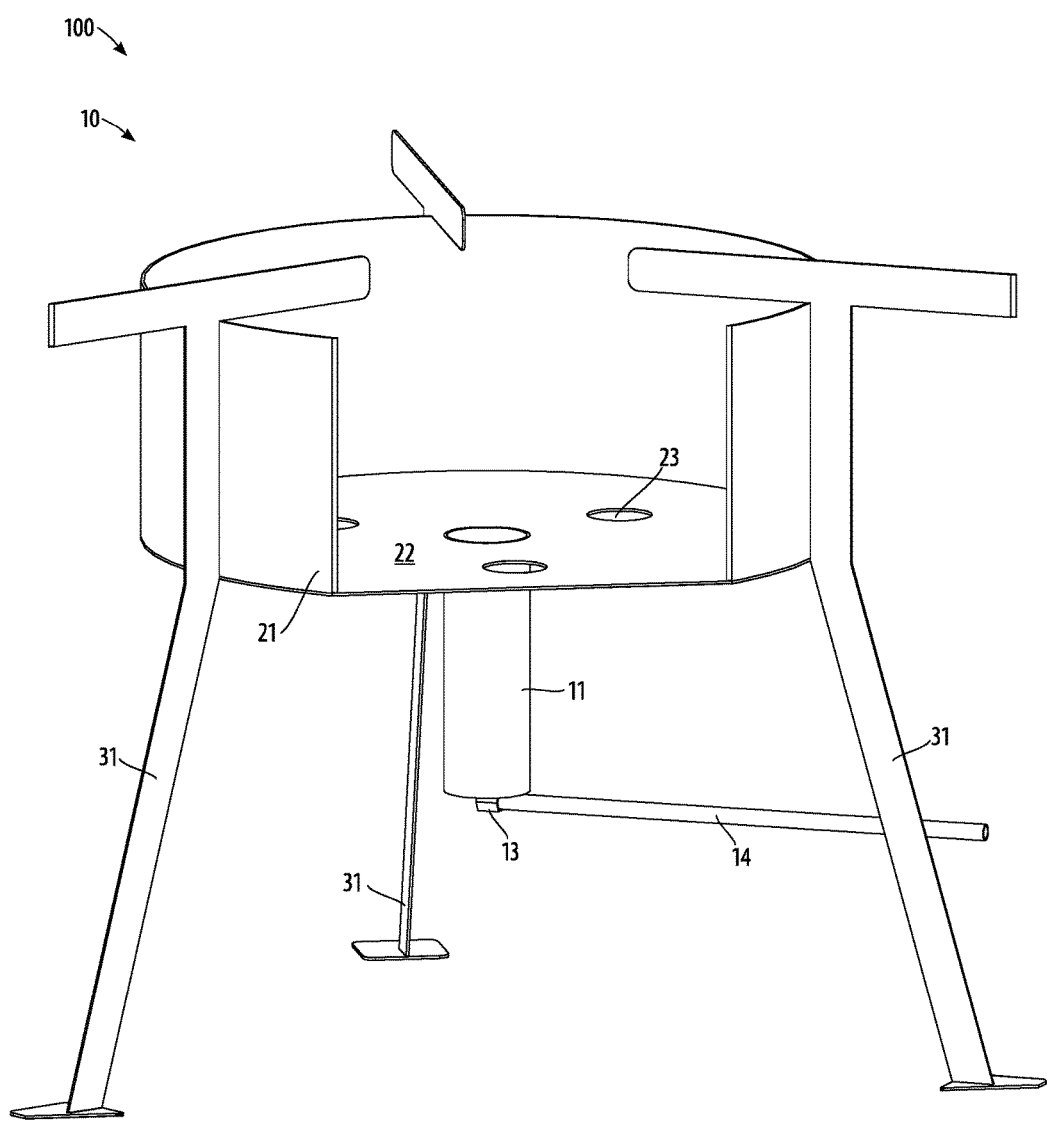
FIG. 6 is a partial-cutaway view of an embodiment of the fast-heating outdoor gas burner.

Referring to FIG. 1 and the other figures generally, the fast-heating outdoor gas burner method 100 and apparatus 10 are shown in use heating a cooking pot.

The construction material most appropriate and available for the fast-heating outdoor gas burner is steel sheet, bar, and tube, with thickness of around 1/16th to 1/8th of an inch, or 1.6 to 3.2 millimeters. The steel and construction method chosen should withstand high heat, rapid heating and cooling cycles, and be durable enough to support a large, heavy, cooking pot full of heavy liquids and solids. Welding is a suitable method of construction. Brass, which does not spark and is machinable, can be used for the gas-pipe cap.

A flammable gas, such as propane or natural gas, is supplied through the gas pipe 14, which terminates with a gas-pipe cap 13, into which is drilled or otherwise created a hole to serve as the gas outlet 12. For propane from a tank, a gas outlet of 1/16-inch diameter is appropriate. For natural gas, the gas outlet can be made somewhat larger to allow a greater flow. The gas outlet 12 is mounted, facing upward, at the bottom center of a combustion tube 11, which is open at both ends, allowing air to be drawn upward with the flammable gas for efficient combustion at or near the top opening of the combustion tube. Although exact sizes and exact ratios are not critical to the operation of the invention, a length of the combustion tube 11 of five to six inches has been found, in working prototypes, to be an effective size. The diameter of the combustion tube should be approximately one-third the length. The illustrated embodiment uses a length of six inches and a diameter of two inches for the combustion tube 11, based on working prototypes tested using propane gas from a tank.

The top of the combustion tube 11 is attached to a hole in the center of a pan bottom 22, which is attached to a pan wall 21 to form an open-topped pan. The vertical height of the pan wall can be approximately the same as the vertical height of the combustion tube 11. The pan bottom 22 has one or more calibrated vents 23, which can be properly sized holes. The larger area of the solid pan bottom 22, in relation to the smaller area of calibrated vents 23, allows only a portion of the air that would otherwise be drawn in. Also, the mostly blocked pan bottom 22 avoids taking air away from air that would otherwise be drawn up through the combustion tube 11. Therefore, the combustion tube 11 is able to draw more air than would be possible with a strong competing draw from the adjacent areas. The increased draw in the combustion tube 11 provides more oxygen at the flame, for a hotter, more complete, and more efficient combustion of the gas. The smaller portion of air that is allowed by the calibrated vents 23 ensures that the air in the open-topped pan does not become oxygen depleted and is allowed to become turbulent, further enhancing complete combustion of the gas and distribution of the heated air.

The assembly of the combustion tube 11, pan wall 21, and pan bottom 22, is held above the ground, and a cooking pot is supported, by the supporting legs 31, of which the number of three, at 60-degree relation to each other, is theoretically the most stable. More supporting legs are possible, and even fewer legs could be implemented with sufficiently broad bases. The upper part of the supporting legs 31 supports the bottom of a cooking pot. The bottom of the cooking pot is held by the supporting legs 31 a distance above the top of the pan wall, providing a gap between the open-topped pan and the cooking pot. The vertical measure of the gap can be about one-sixth of the length of the combustion tube 11 or pan wall 22, or one inch where the combustion tube length is six inches.

In use, the fast-heating outdoor gas burning apparatus receives flammable gas at the gas pipe 14 which is expelled under pressure from the gas outlet 12 in the gas-pipe cap 13, into the combustion tube 11. The expelled gas is mixed with a large amount of air which is drawn into the bottom of the combustion tube 11 with little competition from the solid pan bottom 22. At or near the top of the combustion tube 11, the gas-air mixture ignites, forming a flame. Because of the increased oxygen from the increased air flow, this combustion is highly efficient in converting the energy in the gas to heat.

The air in the open-topped pan, away from the flame, has a favorable oxygen content, and is capable of turbulent movement, because of the supplemented air flow from the calibrated vents 23 in the pan bottom 22. The additional oxygen helps complete the combustion even further, and the turbulent air flow transfers and disperses heated air throughout the open-topped pan and therefore underneath a greater surface area of the bottom of the cooking pot. The turbulent air flow also slows the movement of heated air out of the open-topped pan, allowing for greater heating from longer proximity to the flame. At the pan wall 22, the slowed flow of heated air passes through a significant-sized gap between the top of the open-topped pan and the bottom of the cooking pot. The significant size of the gap, which in total is greater than the inlets provided by the calibrated vents 23 and the combustion tube 11, prevents the heated air from jetting out of the gap and past the cooking pot under pressure. Therefore, the escaping heated air rises slowly and vertically along the side of the cooking pot.

In tests on a working prototype essentially similar to the illustrated embodiment, and in comparison with a presently available outdoor gas burner, each test completely consuming a 4.5-gallon propane tank with a series of 4-gallon pots of water brought from room temperature to a rolling boil, the fast-heating outdoor gas burner made 25 complete boils, taking 9 minutes per boil, as compared to the standard burner making 5 complete boils taking 35 minutes per boil. The fast-heating outdoor gas burner obtained a rolling boil in one quarter of the time, or four times faster, than the standard burner. The fast-heating outdoor gas burner obtained five times the number of complete boils, or five times the energy efficiency, from the same 4.5-gallon tanks of propane.

Figure 7:
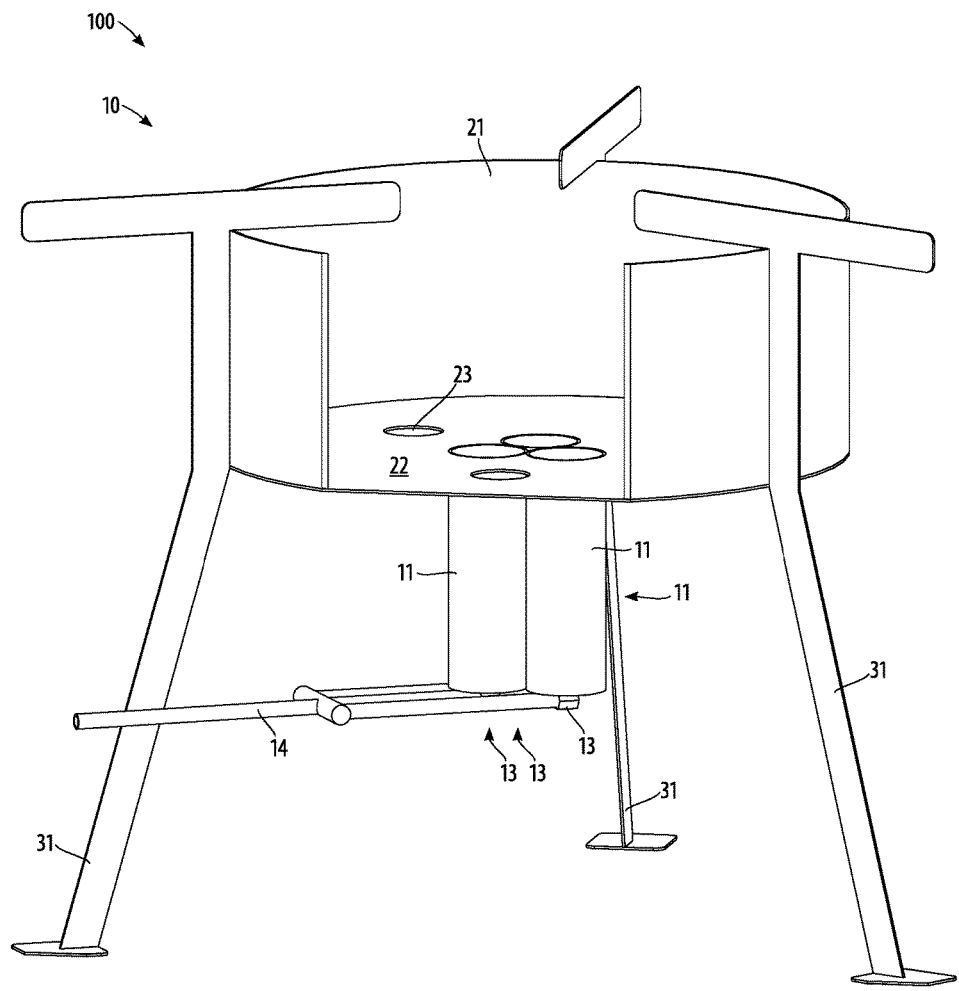
FIG. 7 is a partial-cutaway view of another embodiment of the fast-heating outdoor gas burner having three combustion tubes.
Figure 8:
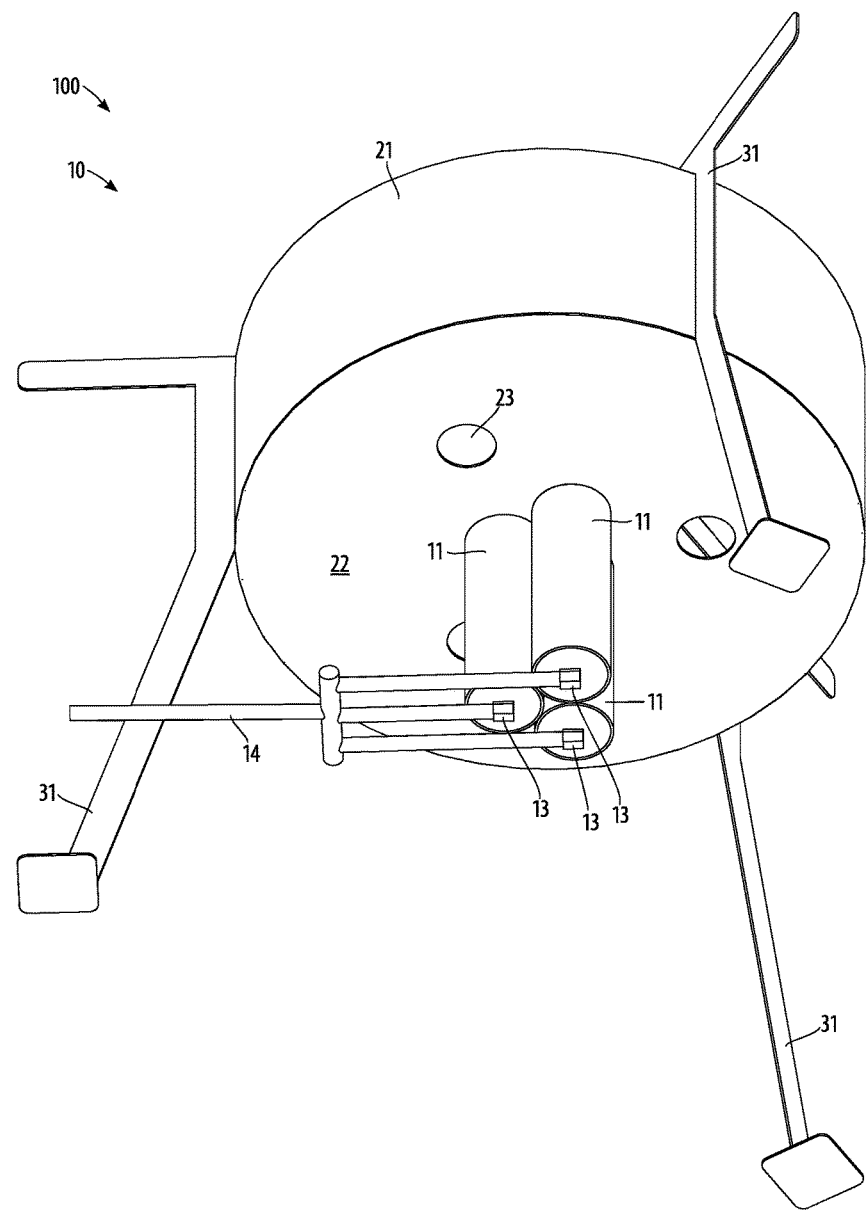
FIG. 8 is an underside orthographic view of another embodiment of the fast-heating outdoor gas burner having three combustion tubes.
Figure 9:
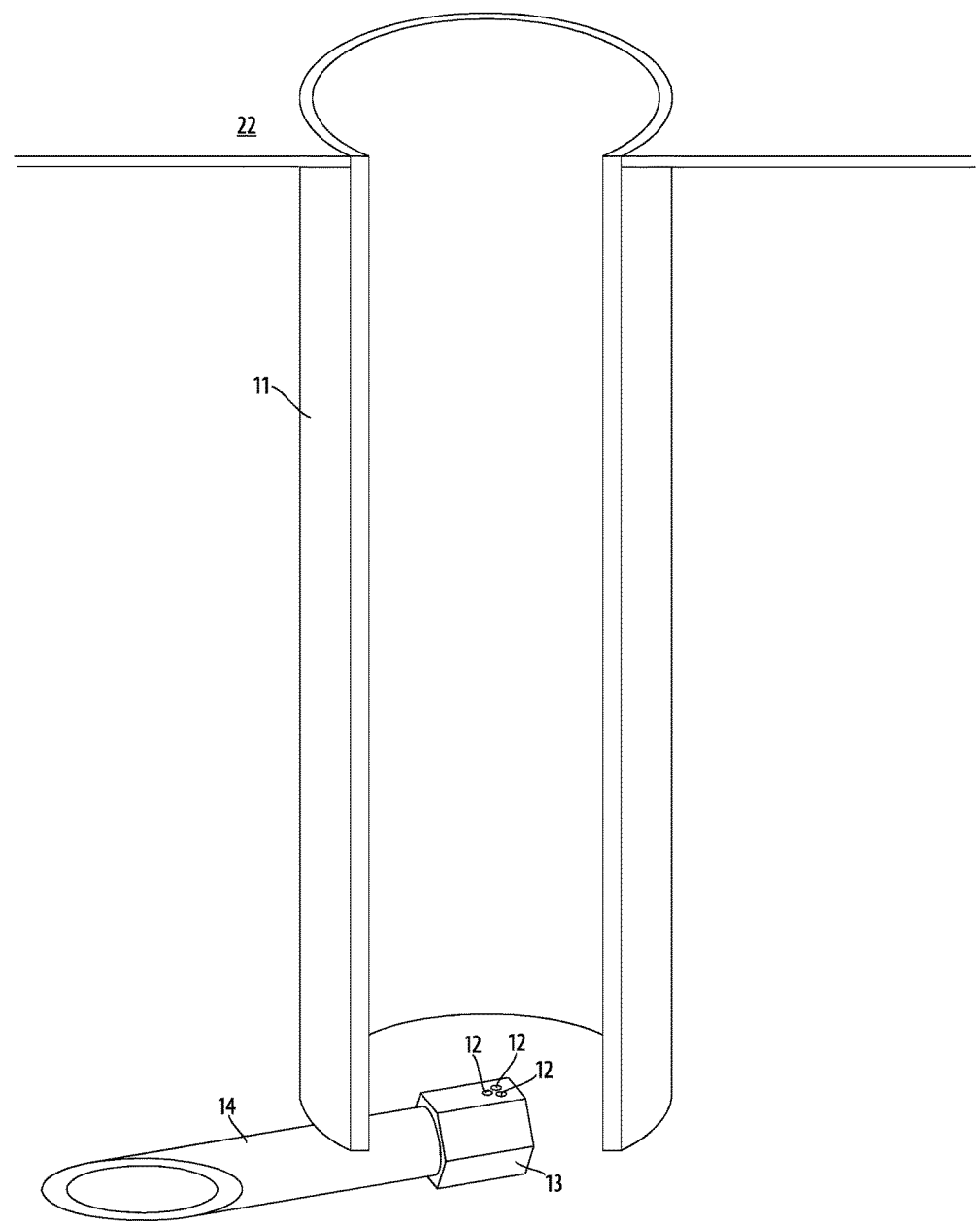
FIG. 9 is a partial-cutaway view of another embodiment of the fast-heating outdoor gas burner having three gas outlets.

Another embodiment of the fast-heating outdoor gas burner, illustrated in FIG. 7 & FIG. 8, provides three combustion tubes 11 fed by a trifurcated gas pipe 14. Such an embodiment can be used to obtain an exceptionally high heat from propane, or to obtain a higher heat from natural gas.

Another embodiment of the fast-heating outdoor gas burner, illustrated in FIG. 0, provides three gas outlets 12 in one gas-pipe cap 13. The number of outlets can be any number from one up to the practical limits of how many holes can be accommodated on the gas-pipe cap 13, and how small the holes can be drilled. Pushing an equivalent amount of gas through separate, smaller gas outlets 12 further increases the mixing of the flammable gas with oxygen in the air drawn through the combustion tube 11, further enhancing the completeness of combustion. Where natural gas is used, requiring a larger single gas outlet or additional gas outlets, the provision of multiple gas outlets is a way to ensure complete combustion and efficiency.

Many changes and modifications can be made in the present invention without departing from the spirit thereof. I therefore pray that my rights to the present invention be limited only by the scope of the appended claims.

We claim:

1. A fast-heating outdoor gas burner apparatus for more thorough combustion and more efficient heating of a cooking pot, comprising:
   (i) at least one combustion tube having an essentially vertical orientation, a vertical length, and a diameter of one-third the vertical length, with an open top end and an open bottom end, where the vertical length of said combustion tube is from five to seven inches, inclusive;
   (ii) at least one gas outlet of small size in a gas-pipe cap attached to a gas pipe, said gas outlet positioned at the center of the open bottom end of said combustion tube;

(iii) a pan wall having an essentially vertical orientation and having the vertical length of said combustion tube, and a diameter of at least twice the vertical length of said combustion tube;
(iv) a pan bottom attached to said pan wall, forming an open-topped pan;
(v) at least one calibrated vent hole in said pan bottom; and
(vi) more than one supporting leg attached to said pan wall such that said pan wall and pan bottom are supported above the ground a distance of at least one-and-a-half times the vertical length of said combustion tube, and such that the cooking pot is supported above the top of said pan wall at a distance of one-sixth the vertical length of said combustion tube;
where the open top end of said combustion tube is attached to an opening in the center of said pan bottom so that said combustion tube extends downward from said pan bottom;
where flammable gas supplied by said gas pipe and emitted under pressure from said gas outlet will pass vertically through said combustion tube and provide a flame at the top end of said combustion tube;
where said pan bottom with said calibrated vent will block a portion of heated rising air, and said combustion tube will accept a large portion of heated rising air, thereby providing increased oxygen for combustion;
where the rising flaming gas will expand into the area encompassed by said pan wall and pan bottom, and will be retained within that area for a period of time, allowing for more complete combustion and a slowing of the flow of heated air; and
where slowed heated air will rise through the space above said pan wall defined by the top portions of said supporting legs, and will rise up the sides of the cooking pot.

2. The fast-heating outdoor gas burner apparatus of claim 1, where the vertical length of said combustion tube is six inches.

3. A fast-heating outdoor gas burner apparatus for more thorough combustion and more efficient heating of a cooking pot, comprising:
(i) at least one combustion tube having an essentially vertical orientation, a vertical length, and a diameter of one-third the vertical length, with an open top end and an open bottom end;
(ii) at least one gas outlet of small size in a gas-pipe cap attached to a gas pipe, said gas outlet positioned at the center of the open bottom end of said combustion tube;
(iii) a pan wall having an essentially vertical orientation and having the vertical length of said combustion tube, and a diameter of at least twice the vertical length of said combustion tube;
(iv) a pan bottom attached to said pan wall, forming an open-topped pan;
(v) at least one calibrated vent hole in said pan bottom; and
(vi) more than one supporting leg attached to said pan wall such that said pan wall and pan bottom are supported above the ground a distance of at least one-and-a-half times the vertical length of said combustion tube, and such that the cooking pot is supported above the top of said pan wall at a distance of one-sixth the vertical length of said combustion tube;
where the open top end of said combustion tube is attached to an opening in the center of said pan bottom so that said combustion tube extends downward from said pan bottom;
where flammable gas supplied by said gas pipe and emitted under pressure from said gas outlet will pass vertically through said combustion tube and provide a flame at the top end of said combustion tube;
where said pan bottom with said calibrated vent will block a portion of heated rising air, and said combustion tube will accept a large portion of heated rising air, thereby providing increased oxygen for combustion;
where the rising flaming gas will expand into the area encompassed by said pan wall and pan bottom, and will be retained within that area for a period of time, allowing for more complete combustion and a slowing of the flow of heated air;
where slowed heated air will rise through the space above said pan wall defined by the top portions of said supporting legs, and will rise up the sides of the cooking pot; and
where said at least one combustion tube further comprises three combustion tubes.

4. The fast-heating outdoor gas burner apparatus of claim 1, where said gas outlet of small size further comprises a gas outlet of from $\frac{1}{32}$-inch to $\frac{1}{8}$-inch diameter, inclusive.

5. The fast-heating outdoor gas burner apparatus of claim 1, where said gas outlet of small size further comprises a gas outlet of $\frac{1}{16}$-inch diameter.

6. The fast-heating outdoor gas burner apparatus of claim 1, where said combustion tube, pan wall, and pan bottom are made of steel.

7. A fast-heating outdoor gas burner apparatus for more thorough combustion and more efficient heating of a cooking pot, comprising:
(i) at least one combustion tube having an essentially vertical orientation, a vertical length, and a diameter of one-third the vertical length, with an open top end and an open bottom end;
(ii) at least one gas outlet of small size in a gas-pipe cap attached to a gas pipe, said gas outlet positioned at the center of the open bottom end of said combustion tube;
(iii) a pan wall having an essentially vertical orientation and having the vertical length of said combustion tube, and a diameter of at least twice the vertical length of said combustion tube;
(iv) a pan bottom attached to said pan wall, forming an open-topped pan;
(v) at least one calibrated vent hole in said pan bottom; and
(vi) more than one supporting leg attached to said pan wall such that said pan wall and pan bottom are supported above the ground a distance of at least one-and-a-half times the vertical length of said combustion tube, and such that the cooking pot is supported above the top of said pan wall at a distance of one-sixth the vertical length of said combustion tube;
where the open top end of said combustion tube is attached to an opening in the center of said pan bottom so that said combustion tube extends downward from said pan bottom;
where flammable gas supplied by said gas pipe and emitted under pressure from said gas outlet will pass vertically through said combustion tube and provide a flame at the top end of said combustion tube;
where said pan bottom with said calibrated vent will block a portion of heated rising air, and said combustion tube will accept a large portion of heated rising air, thereby providing increased oxygen for combustion;

where the rising flaming gas will expand into the area encompassed by said pan wall and pan bottom, and will be retained within that area for a period of time, allowing for more complete combustion and a slowing of the flow of heated air;

where slowed heated air will rise through the space above said pan wall defined by the top portions of said supporting legs, and will rise up the sides of the cooking pot; and where said at least one calibrated vent further comprises more than one calibrated vent.

8. The fast-heating outdoor gas burner apparatus of claim 1, where said more than one supporting leg further comprises three supporting legs placed in 60-degree relation to each other.

9. The fast-heating outdoor gas burner apparatus of claim 1, where said supporting legs are made from flat steel bar material.

10. A fast-heating outdoor gas burner method for more thorough combustion and more efficient heating of a cooking pot, comprising:
  (i) providing a fast-heating outdoor gas burner apparatus, comprising:
    (a) a combustion tube having an essentially vertical orientation, a vertical length, and a diameter of one-third the vertical length, with an open top end and an open bottom end, where the vertical length of said combustion tube is from five to seven inches, inclusive;
    (b) at least one gas outlet of small size in a gas-pipe cap attached to a gas pipe, said gas outlet positioned at the center of the open bottom end of said combustion tube;
    (c) a pan wall having an essentially vertical orientation and having the vertical length of said combustion tube, and a diameter of at least twice the vertical length of said combustion tube;
    (d) a pan bottom attached to said pan wall, forming an open-topped pan;
    (e) at least one calibrated vent hole in said pan bottom; and
    (f) more than one supporting leg attached to said pan wall, such that said pan wall and pan bottom are supported above the ground a distance of at least one-and-a-half times the vertical length of said combustion tube, and such that the cooking pot is supported above the top of said pan wall at a distance of one-sixth the vertical length of said combustion tube;
  where the open top end of said combustion tube is attached to an opening in the center of said pan bottom so that said combustion tube extends downward from said pan bottom;
  where flammable gas supplied by said gas pipe and emitted under pressure from said gas outlet will pass vertically through said combustion tube and provide a flame at the top end of said combustion tube;
  where said pan bottom with said calibrated vent will block a portion of heated rising air, and said combustion tube will accept a large portion of heated rising air, thereby providing increased oxygen for combustion;
  where the rising flaming gas will expand into the area encompassed by said pan wall and pan bottom, and will be retained within that area for a period of time, allowing for more complete combustion and a slowing of the flow of heated air; and
  where slowed heated air will rise through the space above said pan wall defined by the top portions of said supporting legs, and will rise up the sides of the cooking pot;
  (ii) igniting the gas emitted from the top end of said combustion tube; and
  (iii) placing the cooking pot upon the supporting legs above the top of said pan wall.

11. The fast-heating outdoor gas burner method of claim 10, where the vertical length of said combustion tube is six inches.

12. A fast-heating outdoor gas burner method for more thorough combustion and more efficient heating of a cooking pot, comprising:
  (i) providing a fast-heating outdoor gas burner apparatus, comprising:
    (a) a combustion tube having an essentially vertical orientation, a vertical length, and a diameter of one-third the vertical length, with an open top end and an open bottom end,
      where said at least one combustion tube further comprises three combustion tubes;
    (b) at least one gas outlet of small size in a gas-pipe cap attached to a gas pipe, said gas outlet positioned at the center of the open bottom end of said combustion tube;
    (c) a pan wall having an essentially vertical orientation and having the vertical length of said combustion tube, and a diameter of at least twice the vertical length of said combustion tube;
    (d) a pan bottom attached to said pan wall, forming an open-topped pan;
    (e) at least one calibrated vent hole in said pan bottom; and
    (f) more than one supporting leg attached to said pan wall, such that said pan wall and pan bottom are supported above the ground a distance of at least one-and-a-half times the vertical length of said combustion tube, and such that the cooking pot is supported above the top of said pan wall at a distance of one-sixth the vertical length of said combustion tube;
  where the open top end of said combustion tube is attached to an opening in the center of said pan bottom so that said combustion tube extends downward from said pan bottom;
  where flammable gas supplied by said gas pipe and emitted under pressure from said gas outlet will pass vertically through said combustion tube and provide a flame at the top end of said combustion tube;
  where said pan bottom with said calibrated vent will block a portion of heated rising air, and said combustion tube will accept a large portion of heated rising air, thereby providing increased oxygen for combustion;
  where the rising flaming gas will expand into the area encompassed by said pan wall and pan bottom, and will be retained within that area for a period of time, allowing for more complete combustion and a slowing of the flow of heated air; and
  where slowed heated air will rise through the space above said pan wall defined by the top portions of said supporting legs, and will rise up the sides of the cooking pot;
  (ii) igniting the gas emitted from the top end of said combustion tube; and
  (iii) placing the cooking pot upon the supporting legs above the top of said pan wall.

13. The fast-heating outdoor gas burner method of claim 10, where said gas outlet of small size further comprises a gas outlet of from 1/32-inch to 1/8-inch diameter, inclusive.

14. The fast-heating outdoor gas burner method of claim 10, where said gas outlet of small size further comprises a gas outlet of 1/16-inch diameter.

15. The fast-heating outdoor gas burner method of claim 10, where said combustion tube, pan wall, and pan bottom are made of steel.

16. A fast-heating outdoor gas burner method for more thorough combustion and more efficient heating of a cooking pot, comprising:

(i) providing a fast-heating outdoor gas burner apparatus, comprising:

(a) a combustion tube having an essentially vertical orientation, a vertical length, and a diameter of one-third the vertical length, with an open top end and an open bottom end;

(b) at least one gas outlet of small size in a gas-pipe cap attached to a gas pipe, said gas outlet positioned at the center of the open bottom end of said combustion tube;

(c) a pan wall having an essentially vertical orientation and having the vertical length of said combustion tube, and a diameter of at least twice the vertical length of said combustion tube;

(d) a pan bottom attached to said pan wall, forming an open-topped pan;

(e) at least one calibrated vent hole in said pan bottom, where said at least one calibrated vent further comprises more than one calibrated vent; and (f) more than one supporting leg attached to said pan wall, such that said pan wall and pan bottom are supported above the ground a distance of at least one-and-a-half times the vertical length of said combustion tube, and such that the cooking pot is supported above the top of said pan wall at a distance of one-sixth the vertical length of said combustion tube;

where the open top end of said combustion tube is attached to an opening in the center of said pan bottom so that said combustion tube extends downward from said pan bottom;

where flammable gas supplied by said gas pipe and emitted under pressure from said gas outlet will pass vertically through said combustion tube and provide a flame at the top end of said combustion tube;

where said pan bottom with said calibrated vent will block a portion of heated rising air, and said combustion tube will accept a large portion of heated rising air, thereby providing increased oxygen for combustion;

where the rising flaming gas will expand into the area encompassed by said pan wall and pan bottom, and will be retained within that area for a period of time, allowing for more complete combustion and a slowing of the flow of heated air; and where slowed heated air will rise through the space above said pan wall defined by the top portions of said supporting legs, and will rise up the sides of the cooking pot;

(ii) igniting the gas emitted from the top end of said combustion tube; and (iii) placing the cooking pot upon the supporting legs above the top of said pan wall.

17. The fast-heating outdoor gas burner method of claim 10, where said more than one supporting leg further comprises three supporting legs placed in 60-degree relation to each other.

18. The fast-heating outdoor gas burner method of claim 10, where said supporting legs are made from flat steel bar material.

* * * * *